US011160373B2

(12) United States Patent
Cattaneo

(10) Patent No.: US 11,160,373 B2
(45) Date of Patent: Nov. 2, 2021

(54) JOINING AND LEVELLING SYSTEM FOR PARTS OF FURNITURE AND FURNISHING ITEMS WITH THE SHOULDER ON THE FLOOR

(71) Applicant: LEONARDO S.R.L., Figino Serenza (IT)

(72) Inventor: Carlo Cattaneo, Figino Serenza (IT)

(*) Notice: Subject to any disclaimer, the term of this patent is extended or adjusted under 35 U.S.C. 154(b) by 5 days.

(21) Appl. No.: 16/641,178

(22) PCT Filed: Aug. 31, 2018

(86) PCT No.: PCT/IB2018/056673
§ 371 (c)(1),
(2) Date: Feb. 21, 2020

(87) PCT Pub. No.: WO2019/049008
PCT Pub. Date: Mar. 14, 2019

(65) Prior Publication Data
US 2020/0196755 A1   Jun. 25, 2020

(30) Foreign Application Priority Data
Sep. 8, 2017   (IT) .................. 102017000100709

(51) Int. Cl.
*A47B 91/02* (2006.01)
*A47B 91/00* (2006.01)
*F16B 12/20* (2006.01)

(52) U.S. Cl.
CPC .......... *A47B 91/022* (2013.01); *A47B 91/005* (2013.01); *F16B 12/2063* (2013.01)

(58) Field of Classification Search
CPC combination set(s) only.
See application file for complete search history.

(56) References Cited

U.S. PATENT DOCUMENTS

| 4,991,805 | A | * | 2/1991 | Solak | F16M 7/00 248/188.4 |
| 5,398,620 | A | * | 3/1995 | Rouch | F16M 7/00 108/1 |

(Continued)

FOREIGN PATENT DOCUMENTS

| EP | 2653068 A1 | 10/2013 |
| JP | 2002085176 A | 3/2002 |

(Continued)

*Primary Examiner* — Monica E Millner
(74) *Attorney, Agent, or Firm* — Themis Law

(57) ABSTRACT

A joining and levelling system for furniture and furnishing items with a bottom and a shoulder positionable on a floor includes a front body and a rear body each having a connection group and a blocking group, adapted to stably interconnect the bottom and the shoulder, and a levelling group. The connection group, the blocking group and the levelling group can be actuated from the front of the furniture, the front body and the rear body being each positionable in lateral contact with the shoulder and beneath the bottom, actuation points of the connection group, the blocking group and the levelling group of the front and rear bodies being positionable on a horizontal plane parallel to the floor and to the bottom, adjacent to each other. A symmetry axis of the connection group coincides with or is substantially close to a center line of the front and rear bodies.

12 Claims, 13 Drawing Sheets

(56) References Cited

U.S. PATENT DOCUMENTS

| | | | | |
|---|---|---|---|---|
| 7,597,294 | B2* | 10/2009 | Lotz | D06F 39/125 |
| | | | | 248/188.3 |
| 8,220,760 | B2* | 7/2012 | Fetzer | A47L 15/4253 |
| | | | | 248/188.4 |
| 2007/0205342 | A1* | 9/2007 | Gabriel | F16M 7/00 |
| | | | | 248/188.4 |

FOREIGN PATENT DOCUMENTS

| | | | |
|---|---|---|---|
| WO | 9203663 | A1 | 3/1992 |
| WO | 2005115199 | A1 | 12/2005 |

\* cited by examiner

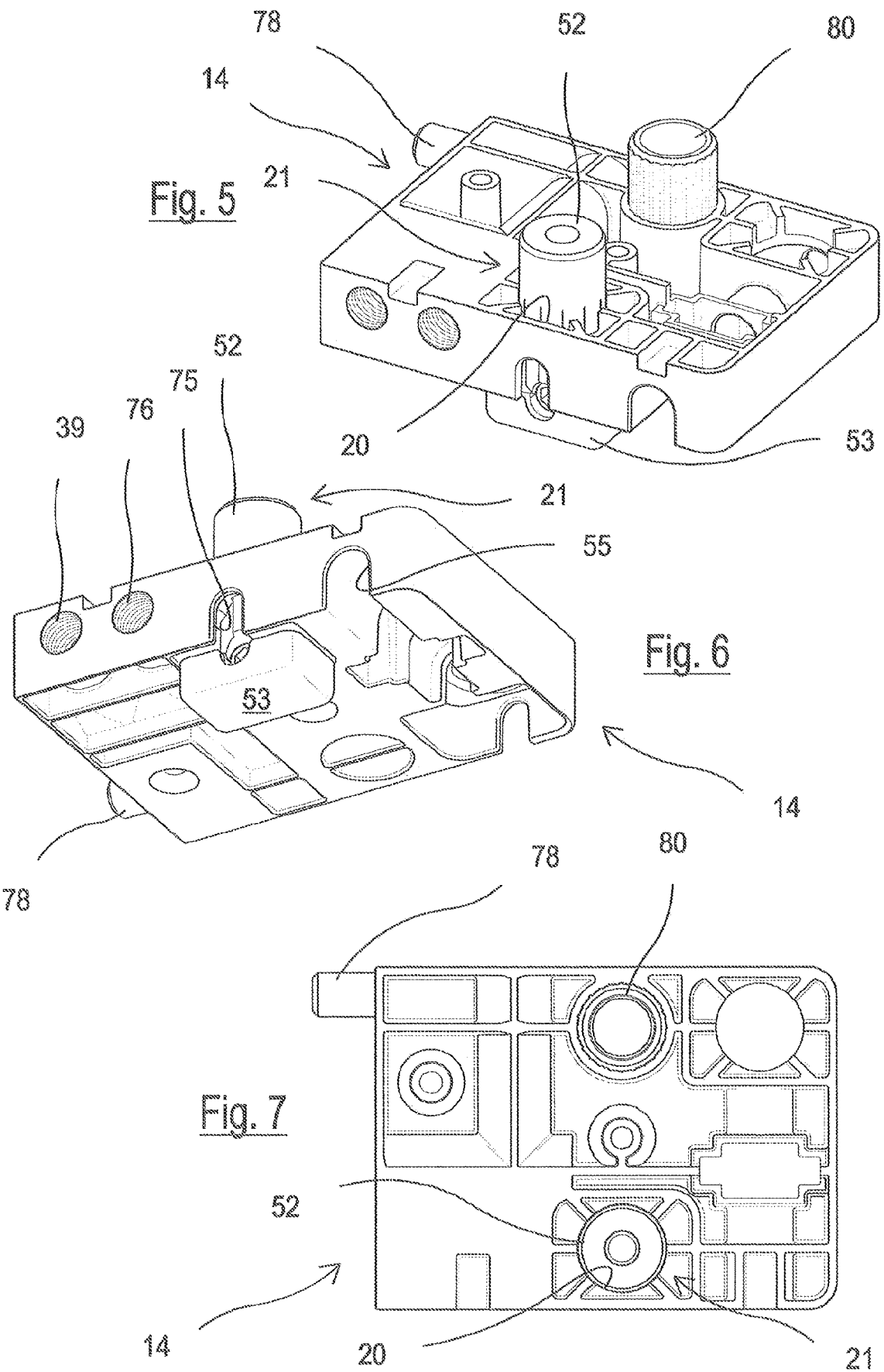

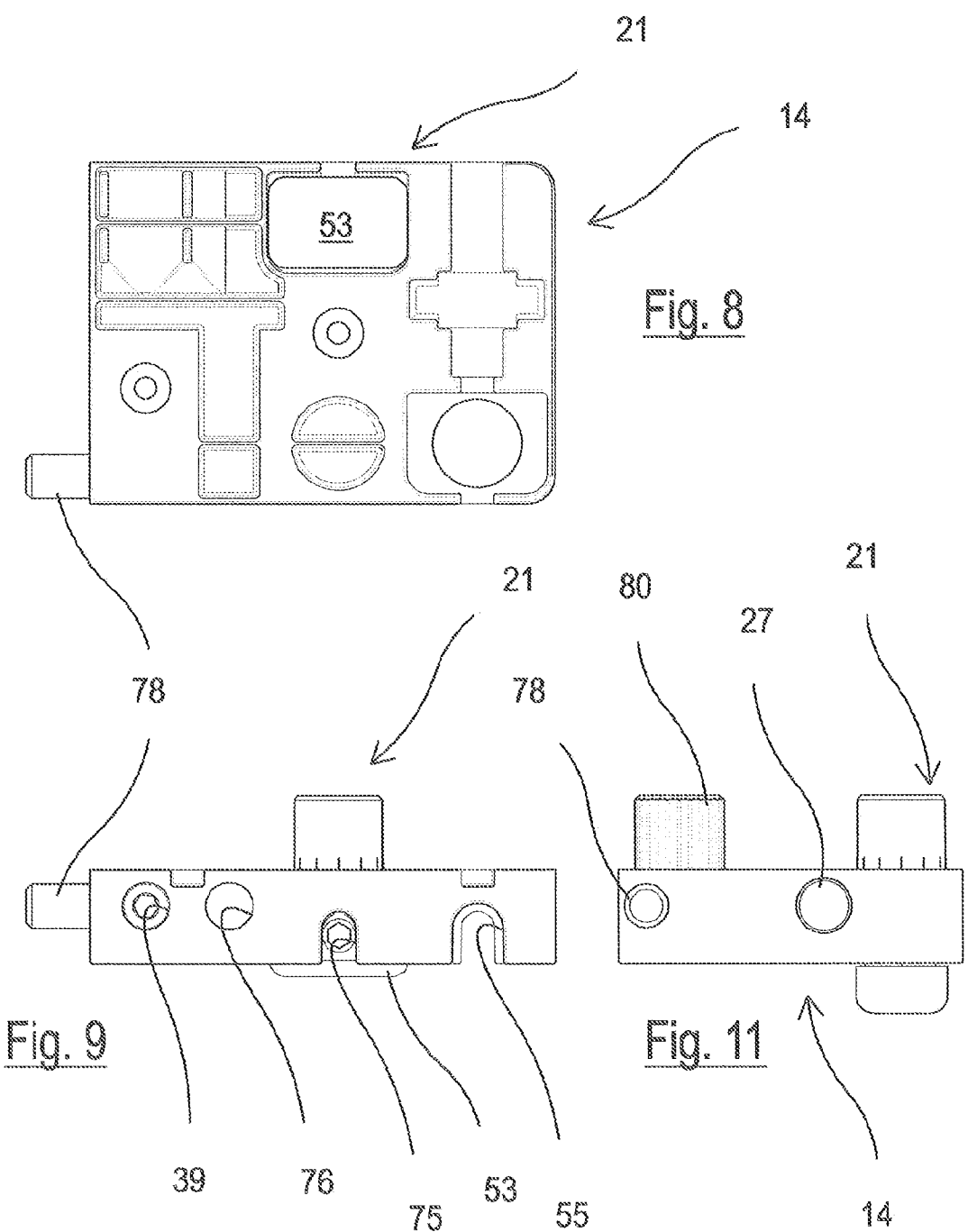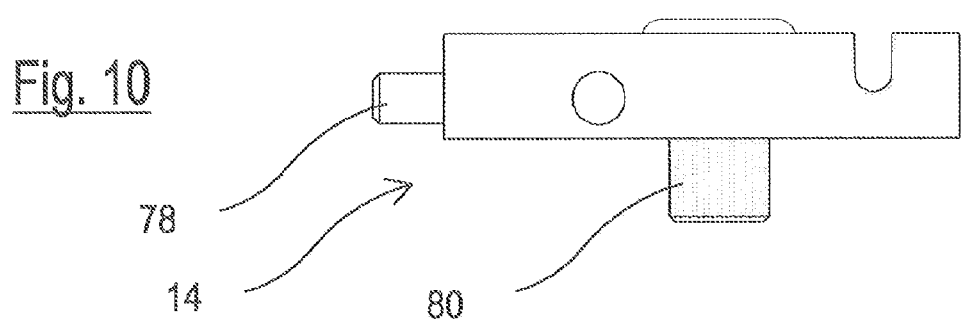

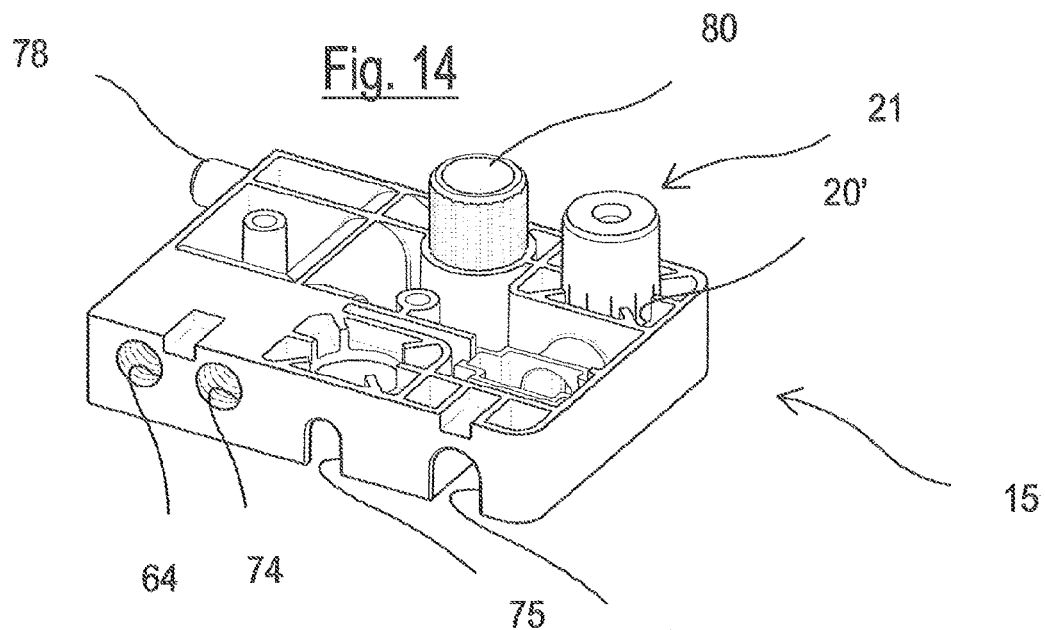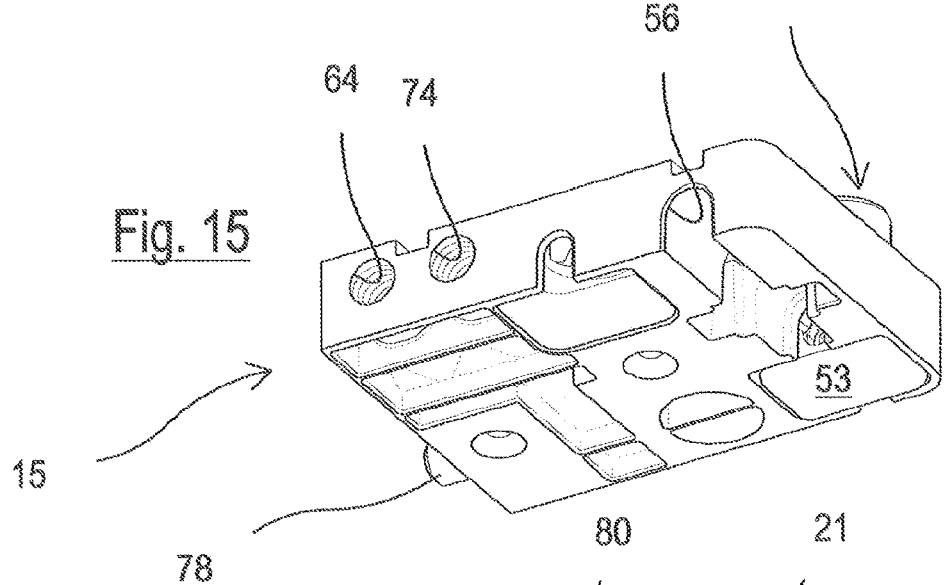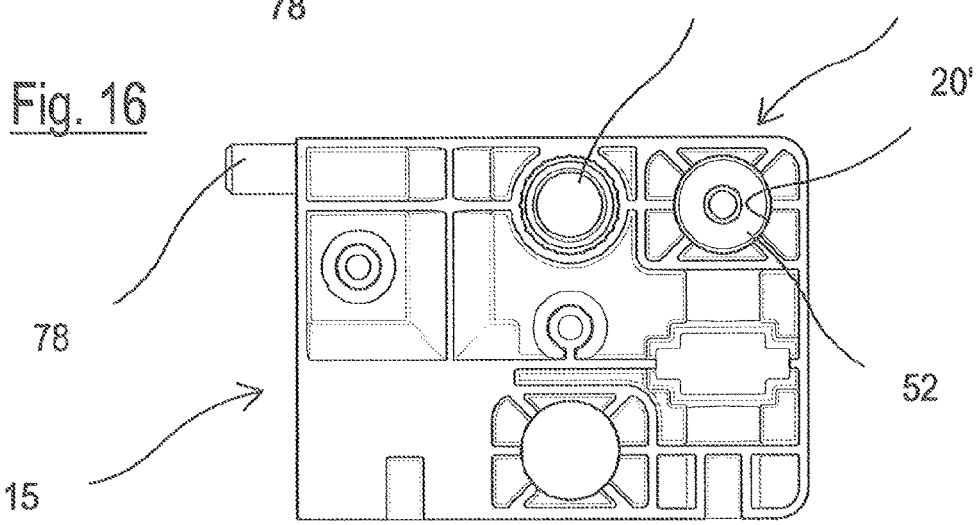

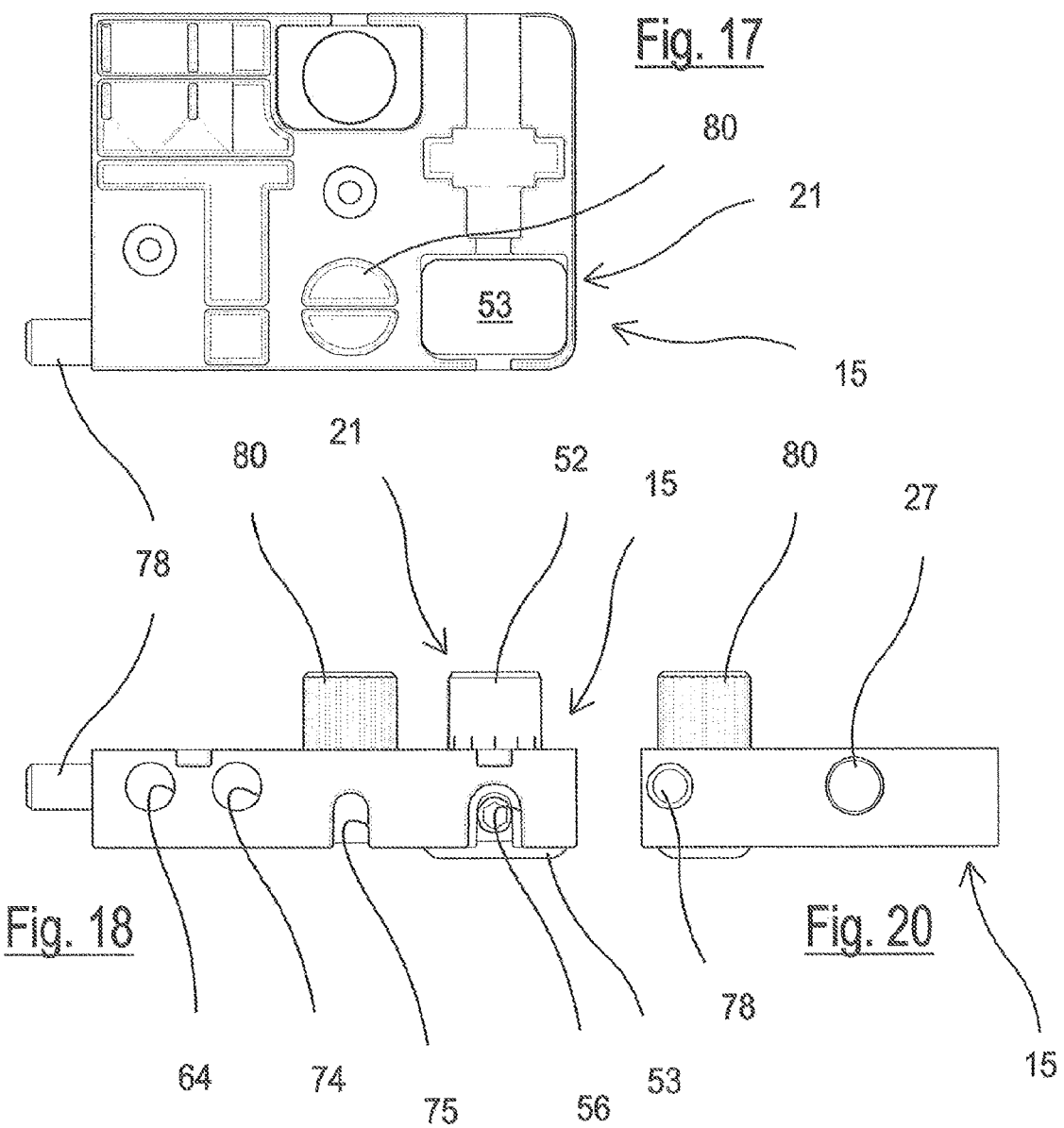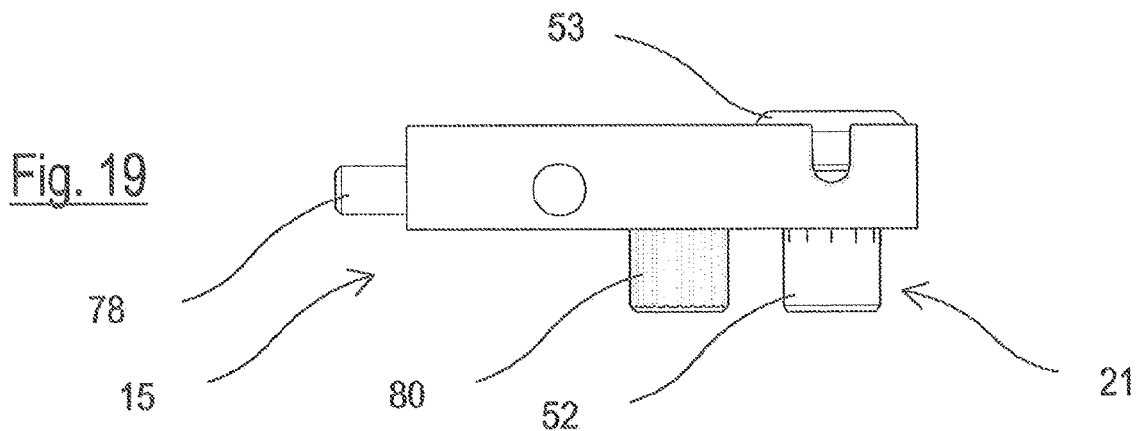

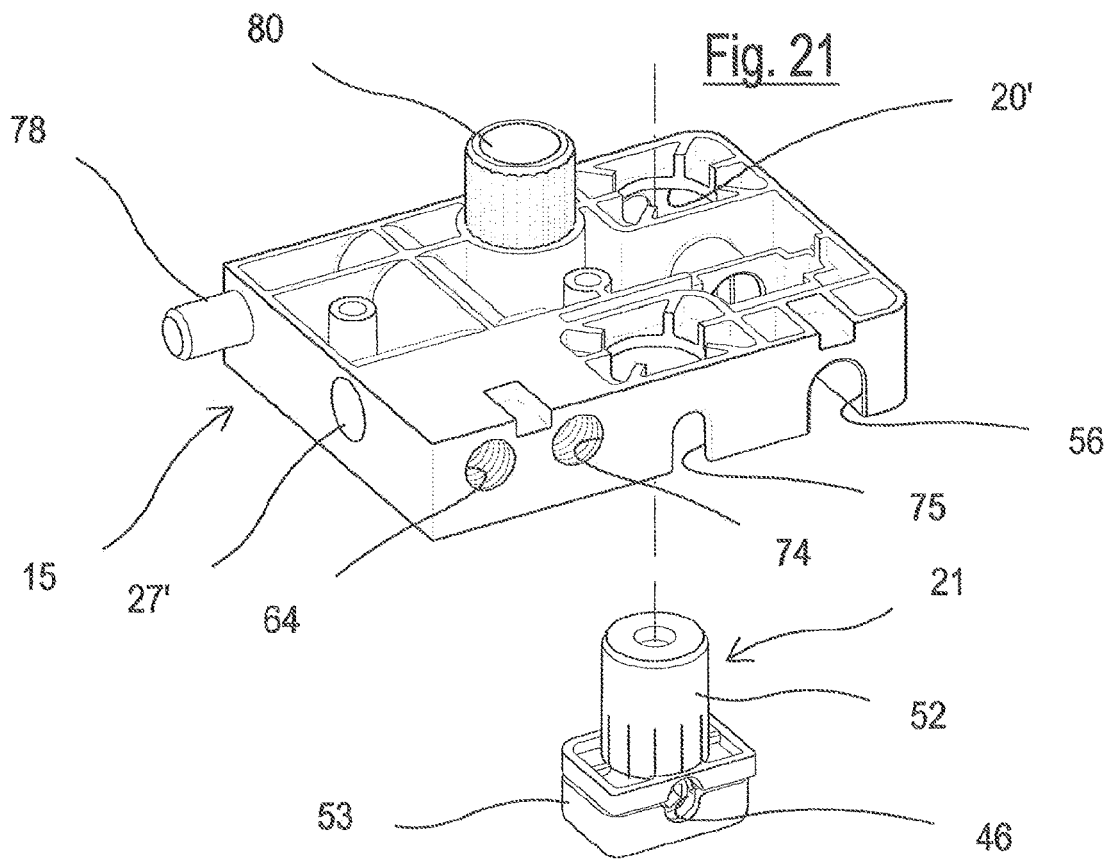
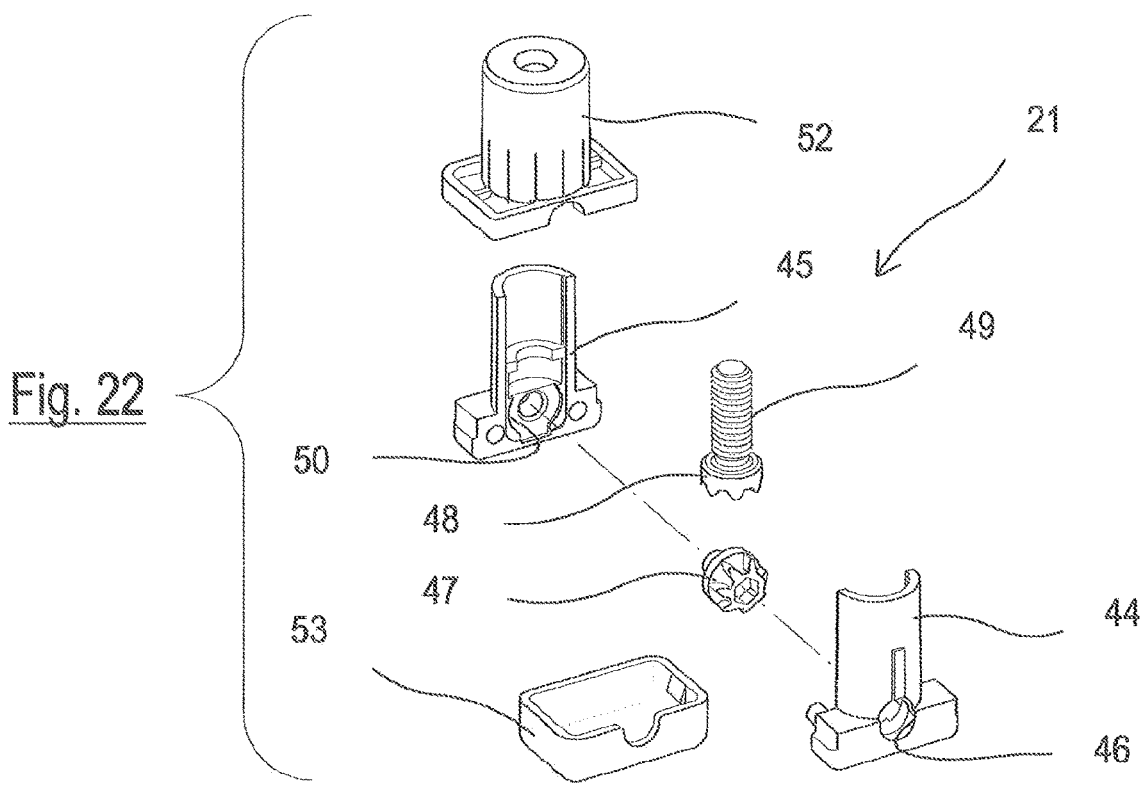

JOINING AND LEVELLING SYSTEM FOR PARTS OF FURNITURE AND FURNISHING ITEMS WITH THE SHOULDER ON THE FLOOR

The present invention relates to a joining and levelling system for parts of furniture and furnishing items with the shoulder on the floor.

Various joining and levelling systems for parts of furniture and furnishing items are known, which involve the formation of a series of visible holes and spaces destined for actuating the junctions and in particular availing of a certain free space beneath the furniture for connecting the shoulder and bottom and for the adjustment of the front and rear levelers in the furniture.

Solutions are also known in which the joining and levelling systems for parts of furniture and furnishing items are contained in restricted spaces beneath the furniture and in general, they propose a front actuation which involves both the device for connecting a bottom to a shoulder and the levelling device of the furniture.

In all of these cases, however, there is an arrangement of the piece of furniture in which the shoulder or shoulders rest on the floor and the bottom or lower shelf is raised with respect to the underlying floor, however a certain space is required beneath the bottom.

In the known art, in fact, or in all of these cases, there are joining and levelling devices certainly in a single body beneath the bottom, but positioned at different heights with respect to the bottom and/or the floor.

Consequently, in order to be able to have access to both the joining and levelling devices between the shoulder and bottom, the free space from the floor must have quite a significant dimension.

These solutions are not satisfactory, however, when extremely limited spaces are required between the lower shelves or bottoms of the furniture and the floor.

This necessity becomes even greater when these pieces of furniture in the form, for example, of living-room furniture incorporating built-in drawer units, cannot provide adjustable feet from the inside of the furniture that occupied by the seat of the drawer unit.

The general objective of the present invention is to provide a joining and levelling system for parts of furniture and furnishing items which solves the problems and drawbacks indicated above.

A further objective of the present invention is to provide a joining and levelling system for parts of furniture and furnishing items that is particularly simplified, compact and that can be positioned in an extremely restricted space with serious difficulty of access.

Another objective of the present invention is to provide a joining and levelling system for parts of furniture and furnishing items that allows a front connection and adjustment, also for joints and levelers in rear bodies positioned beneath the bottom.

The above objectives are achieved by a system having the features specified in the enclosed claim 1 and sub-claims.

The structural and functional characteristics of the invention and the advantages with respect to the known art can be clearly understood from the following description, referring to the attached drawings, which illustrate various embodiments of the invention itself.

In the drawings:

FIGS. 5 and 6 are perspective views according to different directions of a front body provided with a joining device and a levelling device inserted according to the system of the invention;

FIGS. 7 and 8 are plan views from above and below of the body shown in FIGS. 5 and 6;

FIGS. 9, 10 and 11 are raised views from the two long sides and from a short side of the body of FIGS. 5 and 6;

FIGS. 14 and 15 are perspective views according to different directions of a rear body provided with a joining device and a levelling device inserted according to the system of the invention;

FIGS. 16 and 17 are plan views from above and below of the body shown in FIGS. 14 and 15;

FIGS. 18, 19 and 20 are raised views from the two long sides and from a short side of the body of FIGS. 14 and 15;

FIG. 21 is a perspective view similar to that of FIG. 14 with a different angle with a levelling device exploded from the rear body;

FIG. 22 is a perspective view of the levelling device of FIG. 21 with exploded parts;

With reference in general to the drawings, it can be noted that the figures partially illustrate a piece of furniture M, provided with shoulders 11 (in the examples side walls) (only one of which is shown) and a bottom 12.

Figure 2:
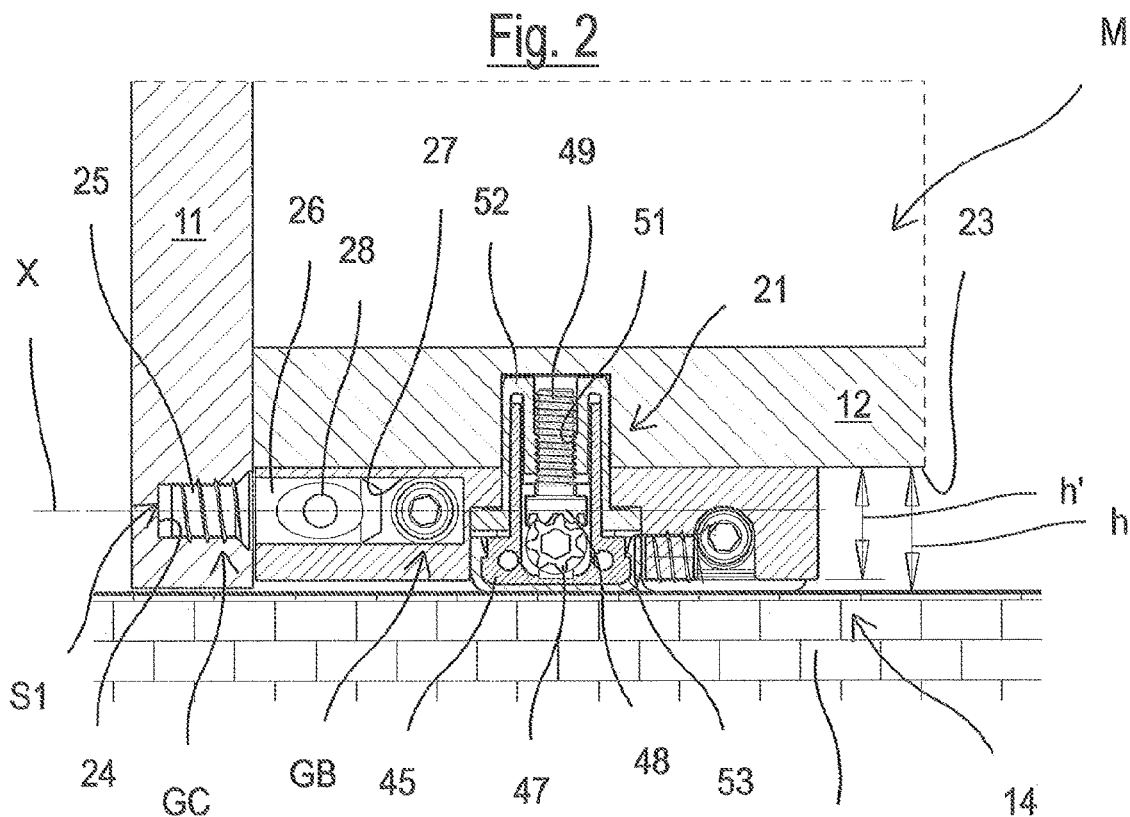
FIG. 2 is a raised sectional view obtained according to the line II-II of FIG. 4 of the front body shown in FIG. 1.
Figure 3:
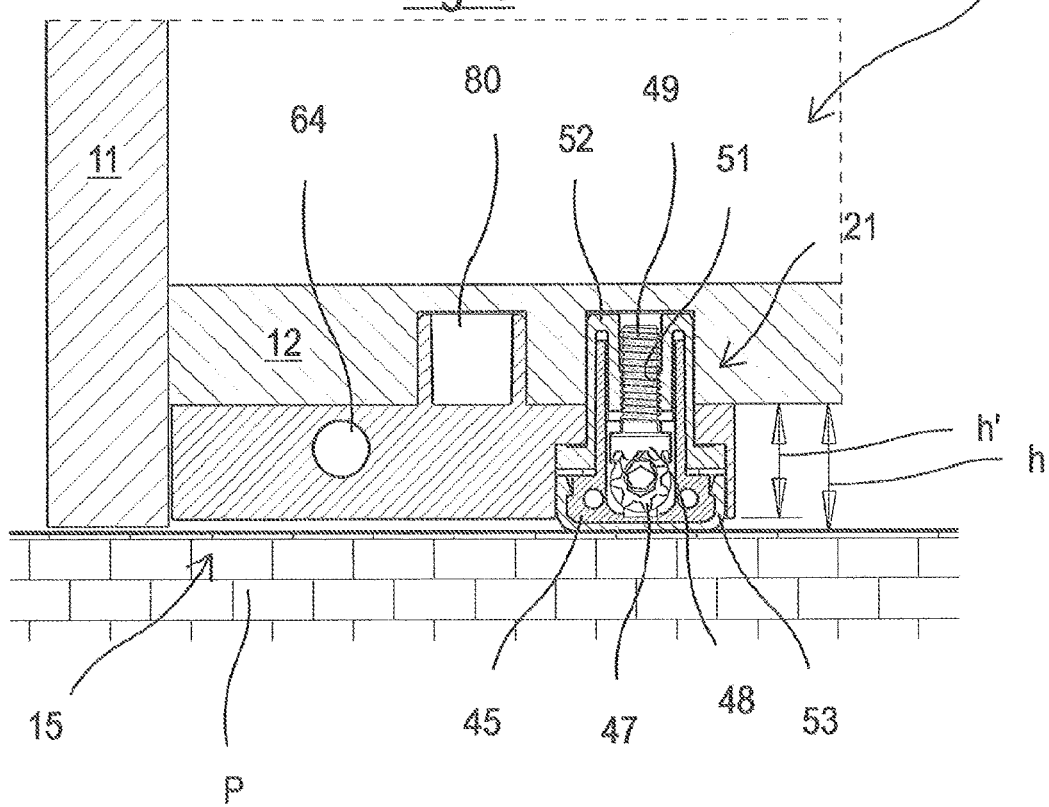
FIG. 3 is a raised sectional view obtained according to the line III-III of FIG. 4 of the rear body shown in FIG. 1.

A front body 14 and a rear body 15 positioned beneath the bottom 12 are also shown. Neither the front body 14 nor the rear body 15 rests on a floor P (FIGS. 2 and 3), but the shoulder 11 connected to the bottom 12 rests on the underlying floor P.

As can be seen, in furniture of this type, a relatively small space is defined beneath the bottom 12. The shoulder 11 or shoulders of the piece of furniture M sustain its entire weight (shoulders, bottom and shelves) in addition to that of the additional contents without any other support.

The distance in height h of the space between the bottom 12 and the floor P, makes it difficult for the operator to have access to the joining and levelling devices of the front body 14 and above all the rear body 15.

In this way is very difficult to provide for the joining and especially for any adjustment when in use, due to the small distance h between the floor P and the bottom 12 of the furniture M.

In reality, it should be noted that the bodies 14, 15 have a height h' which is substantially equal to the height or distance h between the floor P and the bottom 12. In this case the weight would be distributed not only on the shoulders 11 as previously indicated, but also on the bodies 14 and 15.

Furthermore, it should be noted that the distance or height h' can be substantially equal to the thickness of the bottom 12 allowing a uniformity of measures to facilitate the positioning of the various parts and number of different measures minimizing the between them.

FIGS. 1 to 17 show, through a non-limiting example of the system of the invention, how at least a front body 14 and a rear body 15 are fixed to the bottom or base 12 creating a completely innovative joining and levelling system.

Both the front body 14 and rear body 15 incorporate joining devices between the shoulder and bottom of the furniture and furnishing items and levelling devices with respect to the floor P.

From FIGS. 1 to 13, it can be seen how, according to the invention, each front body 14 and rear body 15, for example, prismatic, can be associated beneath the bottom 12 and with a short side thereof in side contact with the shoulder 11.

The front body 14 and the rear body 15 are molded for example in Zamak®, a zinc-based alloy, or in another material suitable for the purpose. The body 14, 15 provides voids and ribs for lightening and/or stiffening.

Both the front body 14 and the rear body 15 provide a first recessed seat or housing 20, 20' for a levelling device 21 in addition receiving, in suitable threaded holes 39, 64, a blocking grub screw of a blocking group GB of a joining device that collaborates with a relative connection group GC.

It should also be noted that a symmetry axis X of the connection group GC coincides with or is substantially close to the centerline of the front 14 and rear 15 bodies. In this case, the horizontal hole 27, 27' of the bodies 14, 15, unlike what is shown, is advantageously produced according to a symmetry axis X coinciding with a symmetry axis of the bottom 12.

Furthermore, both the front body 14 and the rear body 15 provide an extension 80 protruding above the body 14, 15. Said extension 80 is housed in a hole 79 formed in a lower surface 23 in the bottom 12 and collaborating to provide a stable coupling between body 14, 15 and bottom 12.

The connection group GC of the joining device is arranged as follows. The shoulder 11 provides a seat S1 in the form of a horizontal blind hole 24, a threaded end 25 of a pin 26, 26' protruding from the shoulder 11 being stably positioned in said hole 24.

The pins 26, 26', in their protruding part, both provide a housing 28 for a tip of the blocking grub screw 29 of the blocking group GB of the joining device. The pins 26, 26' are to be used for the front body 14 and the rear body 15 respectively.

Furthermore, they are of different lengths to allow them to be actuated from the front part of the furniture. It can in fact be seen from the figures that the pin 26 of the front body 14 is shorter with respect to the pin 26' of the rear body 15. The housing 28 in the pin 26 is arranged at a smaller distance a of the shoulder 11 with respect to a distance b at which the housing 28 of the pin 26' is positioned.

The pin 26, 26', with an axis arranged on a plane parallel to the bottom 12 and to the floor P, is housed in a horizontal hole 27, 27' of the body 14, 15. It can also be noted that the hole 27 is aligned with the hole 24 of the shoulder 11 of the furniture M.

It should be noted that both the front body 14 and the rear body 15 have a plug extension 78 on their short side facing the shoulder. This extension 78 is housed blind hole 77 formed in the shoulder 11. The provision of at least one plug extension 78 gives greater stability to the coupling between the shoulder 11 and the front and rear body 14, 15.

It can therefore also be seen how the blocking group GB of the joining device is created through the threaded holes 39, 64 and the grub screws 29.

The action of a tool for rotating the grub screw 29 inside the threaded holes 39, 64 causes the tip of the grub screw 29 to be brought between a disengagement position and an engagement position with the housing 28 of the respective pin 26, 26'.

This causes the blocking of the pin 26, 26' and therefore the body 14, 15 integral with the bottom 12 with respect to the shoulder 11 of the furniture M.

Figure 23:
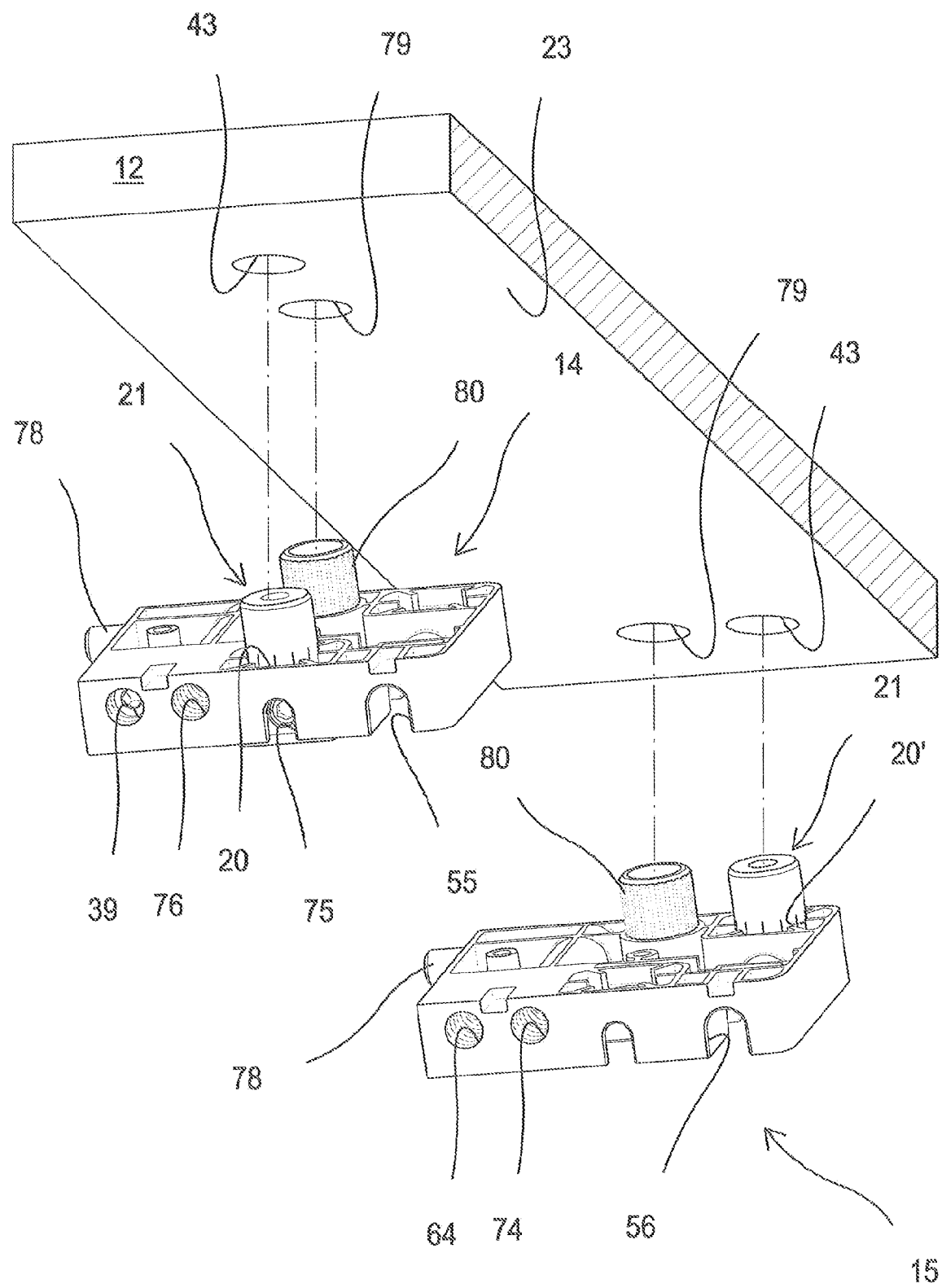
FIGS. 23 to 26 are perspective views that show consecutive insertion phases of the front and rear body into the bottom, the transmission rods therein, the blockage in position of said transmission rods and the assembly of the shoulder with respect to the bottom provided with front and rear bodies.

FIG. 23 shows how a part of the levelling device 21 is inserted in a blind hole 43 formed in the lower surface 23 of the bottom 12 downwards.

The levelling device 21 provides a cylindrical casing, produced for example by means of a pair of half-shells 44, 45 blocked together by means of a base cap or lid 53. In the half-shell 44 of the casing, a hole 46 is provided below for actuating the levelling device 21. The hole 46 provides access to movement means of the leveler 21. A pinion-toothed crown bevel is in fact positioned inside the casing 44, 45. A pinion 47 is rotatingly positioned inside the casing 44, 45, and engages with a toothed crown 48, formed as the head of a threaded screw 49. The toothed crown 48 is rotatable inside a housing 50 of the casing 44, 45, free to rotate but not to translate. The threaded screw 49 is in turn positioned in a threaded hole 51 inside a hollow pusher element 52, in the form of an overturned cup. The hollow pusher element 52 is positioned coaxially with respect to the outside of the casing 44, 45. The rotation of the threaded screw 49 causes the upward and/or downward movement of the hollow pusher element 52 and the adjustment of the leveler by means of a thrust engagement inside a blind hole 43 of the bottom 12.

With these means positioning is obtained at the level of the furniture M with respect to the floor P.

A tool (not shown) controls, through its tip, the pinion 47 passing through the hole 46 of the half-shell 44 of the casing.

For this operation, however, the tool must pass into a front opening 75 of the front body 14.

FIG. 23 shows how a front body 14 and a rear body provided with part of the joining device and levelling device are positioned integral with the bottom 12. This is because part of the levelling device 21 and the extension 80 protruding above the body 14, 15 are inserted in respective holes 43 and 79 formed in the lower surface 23 of the bottom 12 facing downwards facing the floor P.

Figure 24:
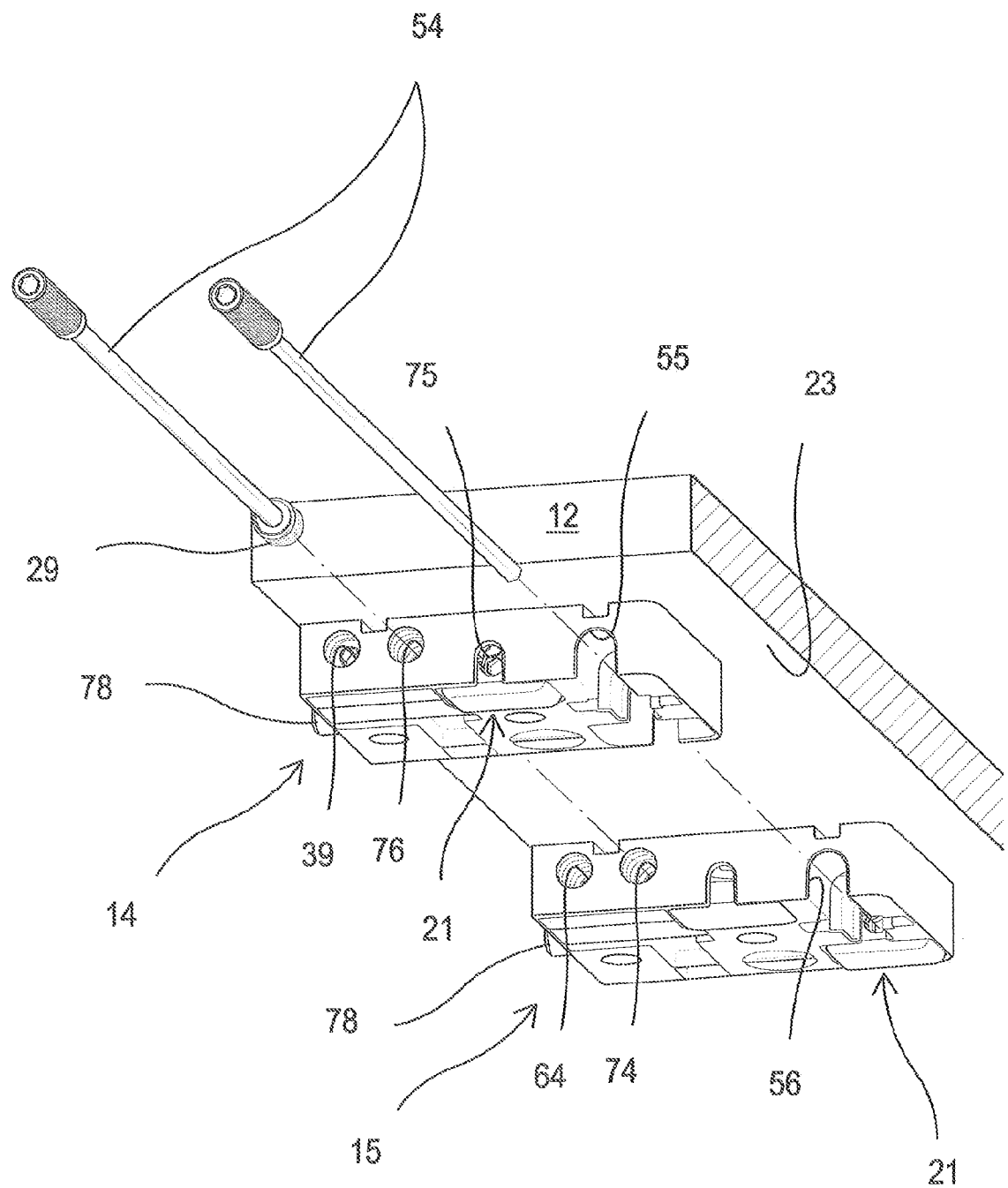

FIG. 24 shows how, once positioned in this way, the front body 14 and the rear body 15, complete with joining device and levelling device, are provided with two transmission rods 54. The first transmission rod 54 is positioned in threaded holes 76 of the body 14 and 15 until it engages a grub screw 29 provided in the rear body 15.

The second rod 54 is positioned in openings 55, 56 passing through the front body 14 and rear body 15 to reach and engage its end in the pinion 47 of the levelling device positioned in the rear body 15.

Figure 25:
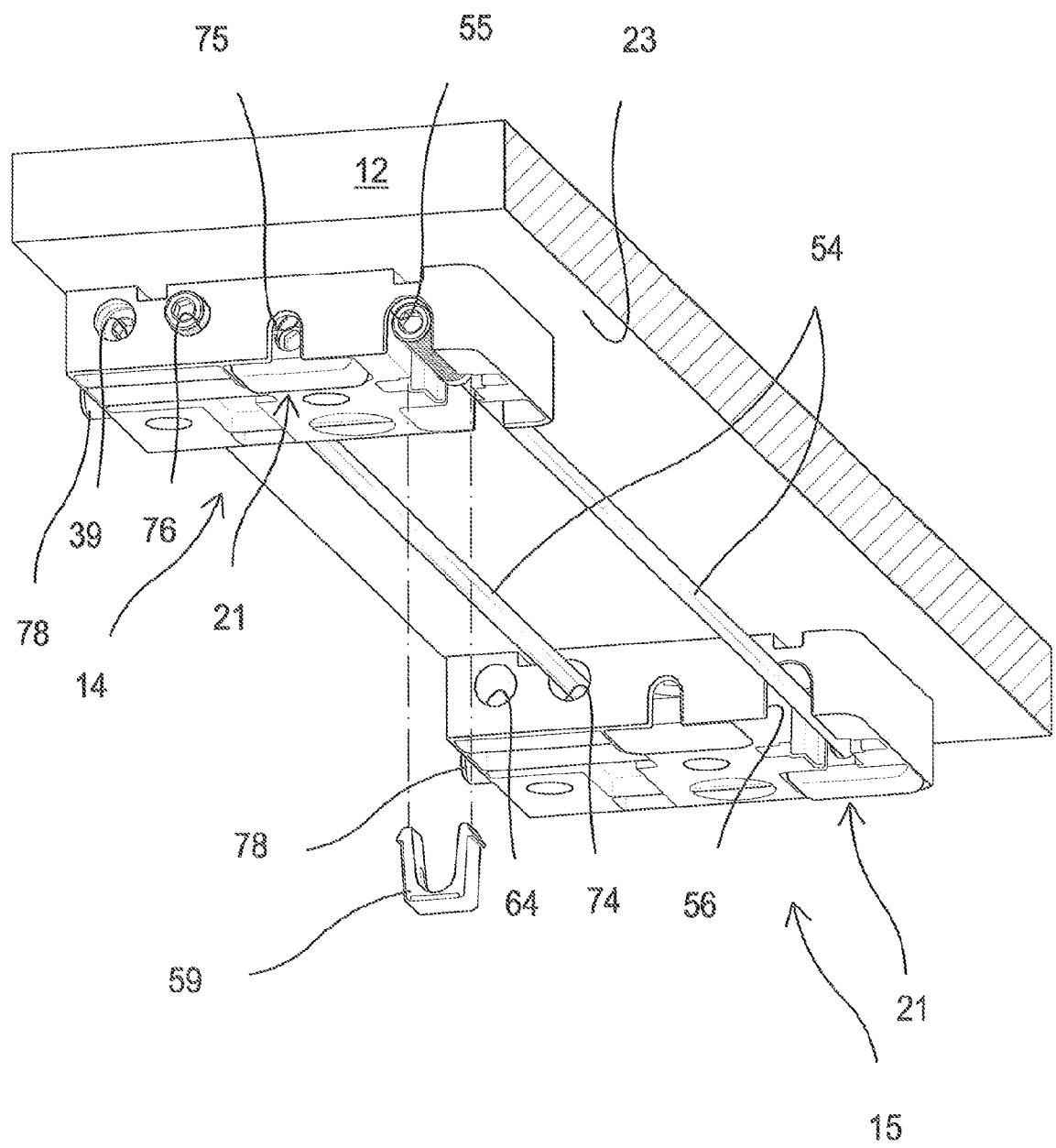

The following FIG. 25 shows how a blocking peg 59 is inserted in a housing 60 of the front body 14 to cause the blockage in this operative position of the transmission rod 54 for the levelling device 21 positioned in the rear body 15.

Figure 26:
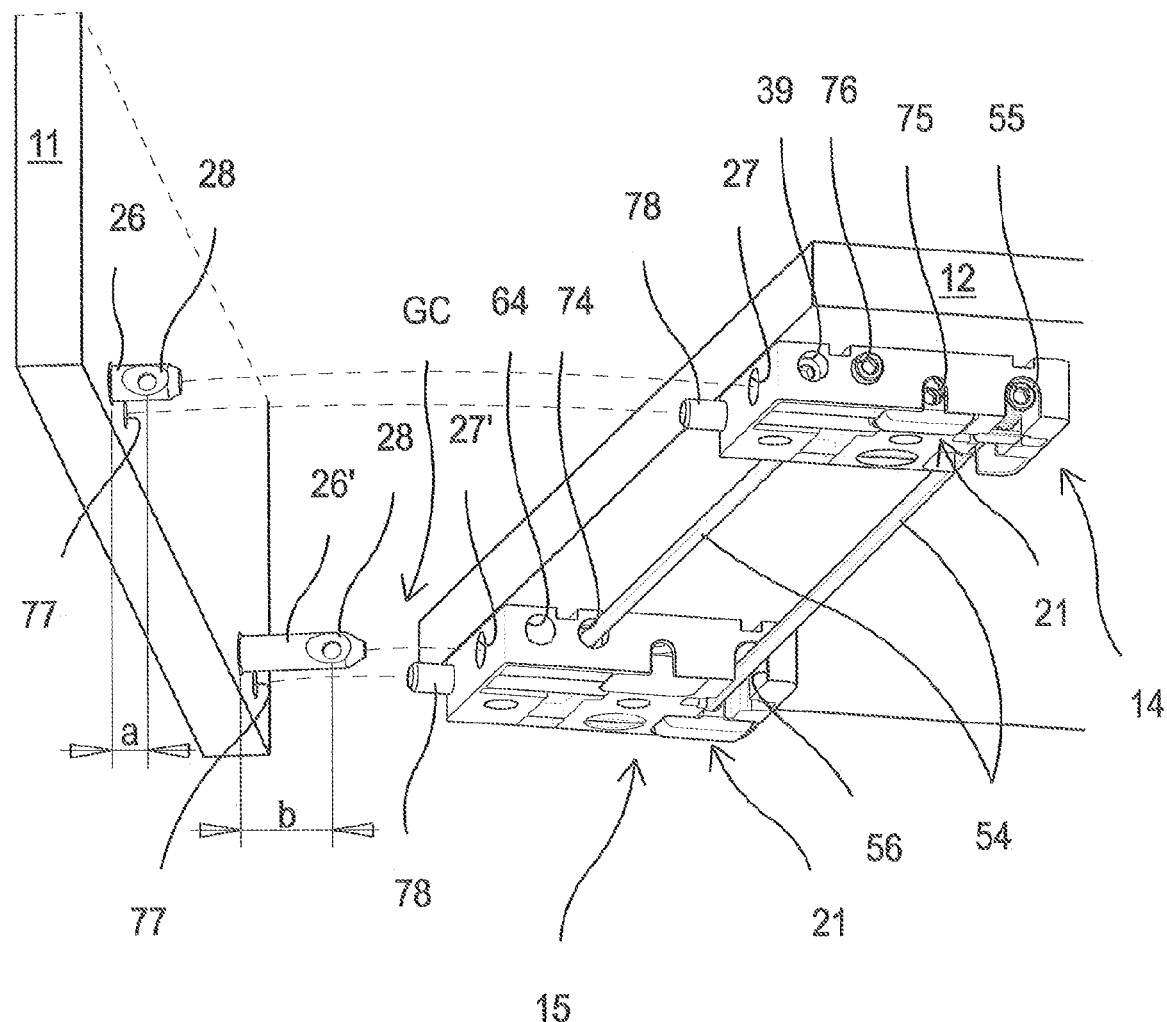

Finally, FIG. 26 shows the final phase in which the shoulder 11 is assembled on the bottom 12.

For this purpose, the pins 26, 26' protruding from the shoulder 11, are inserted in the holes 27 which are formed horizontally in the bottom 12 in a direction parallel the floor P. Furthermore, the plug extensions 78 of the front body 14 and rear body 15 are housed in the holes 77 in the shoulder 11 giving stability to the coupling between the shoulder 11 and bodies 14, 15.

Figure 1:
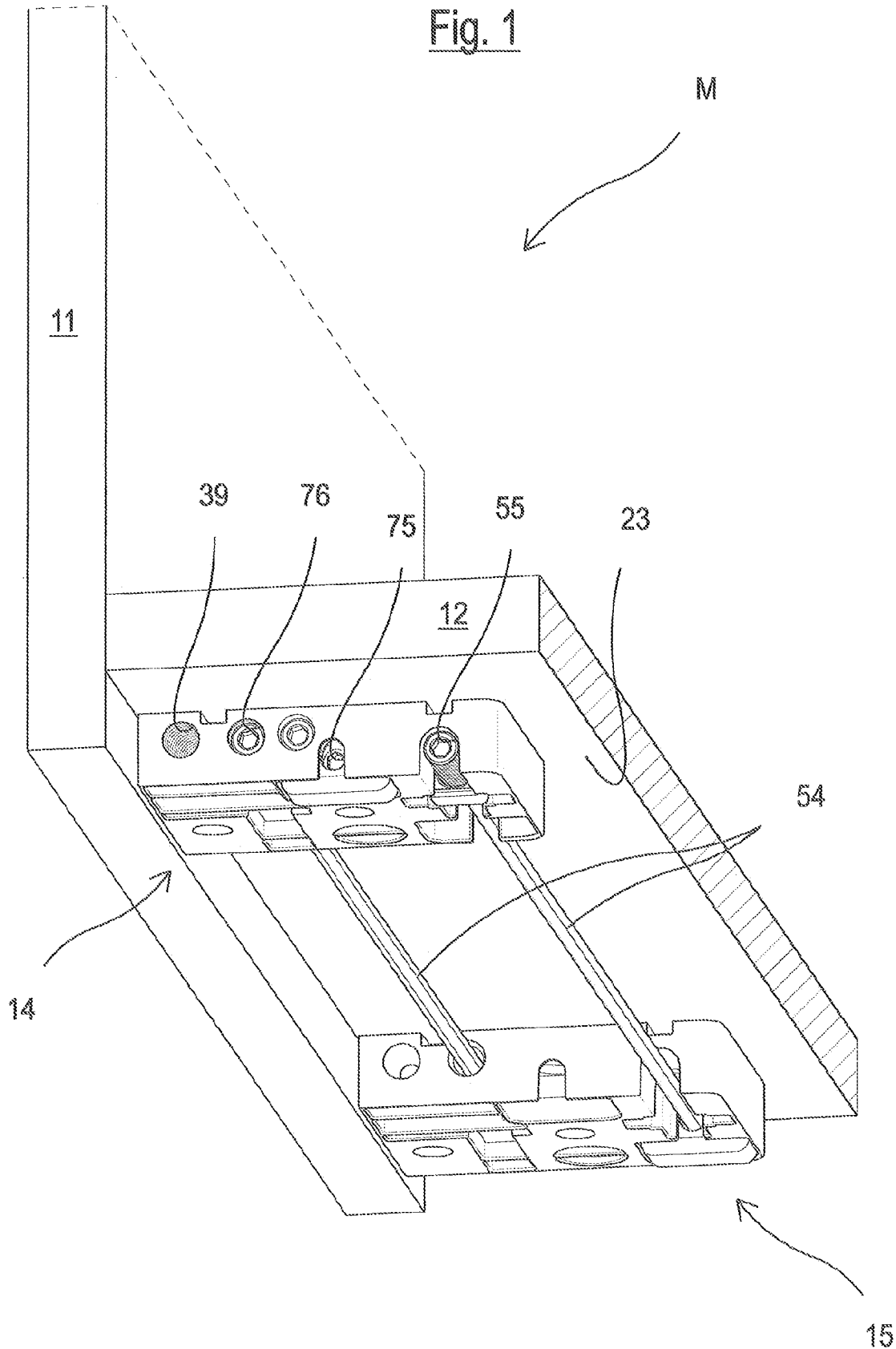
FIG. 1 is a perspective view illustrating an example of a joining and levelling system for parts of furniture and furnishing items produced according to the present invention designed for joining a shoulder on the floor and a base or bottom of a piece of furniture with joining and levelling devices positioned in a front and rear body beneath the bottom of the furniture.

It can also be seen how FIG. 1 or FIGS. 25, 26 show that actuating points of the connection group GC, the blocking group GB and levelling group 21 the front body 14 and rear body 15 are arranged adjacently on a horizontal plane parallel to the floor P and the bottom 12. The encumbrance of the body 14 or 15 is therefore minimized.

Figure 4:
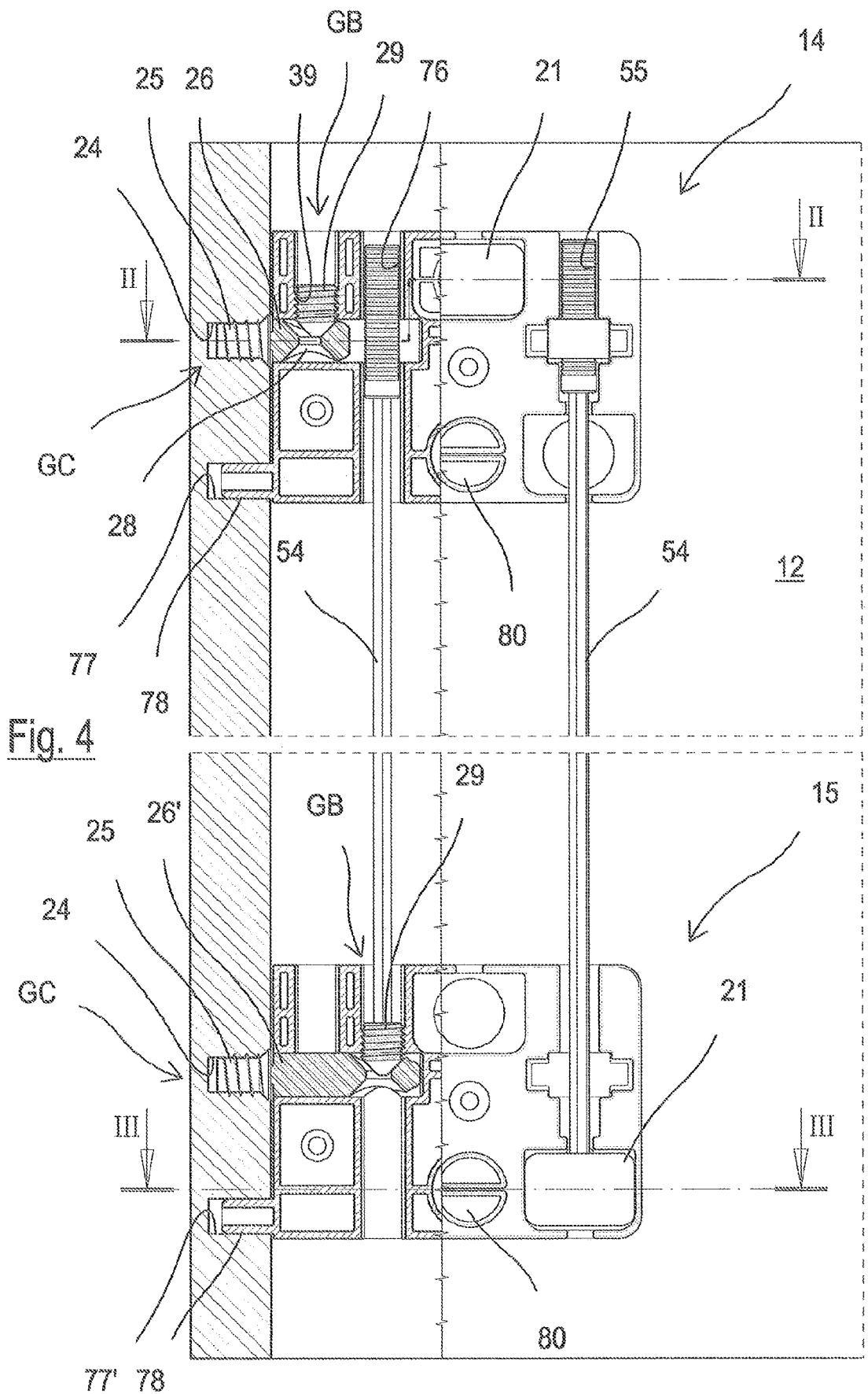
FIG. 4 is a plan sectional view from below of what is illustrated in FIG. 1.
Figure 12:
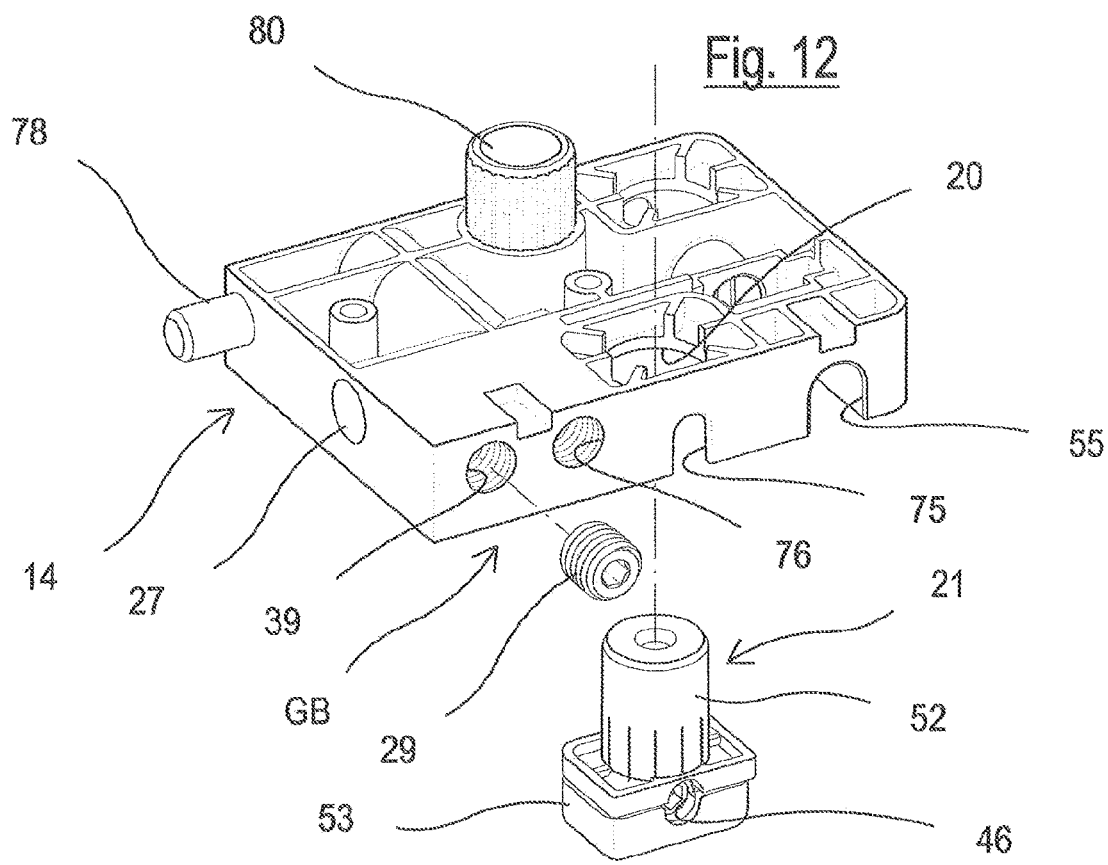
FIG. 12 is a perspective view similar to that of FIG. 5 with a different angle with a joining grub screw and levelling device exploded from the front body.
Figure 13:
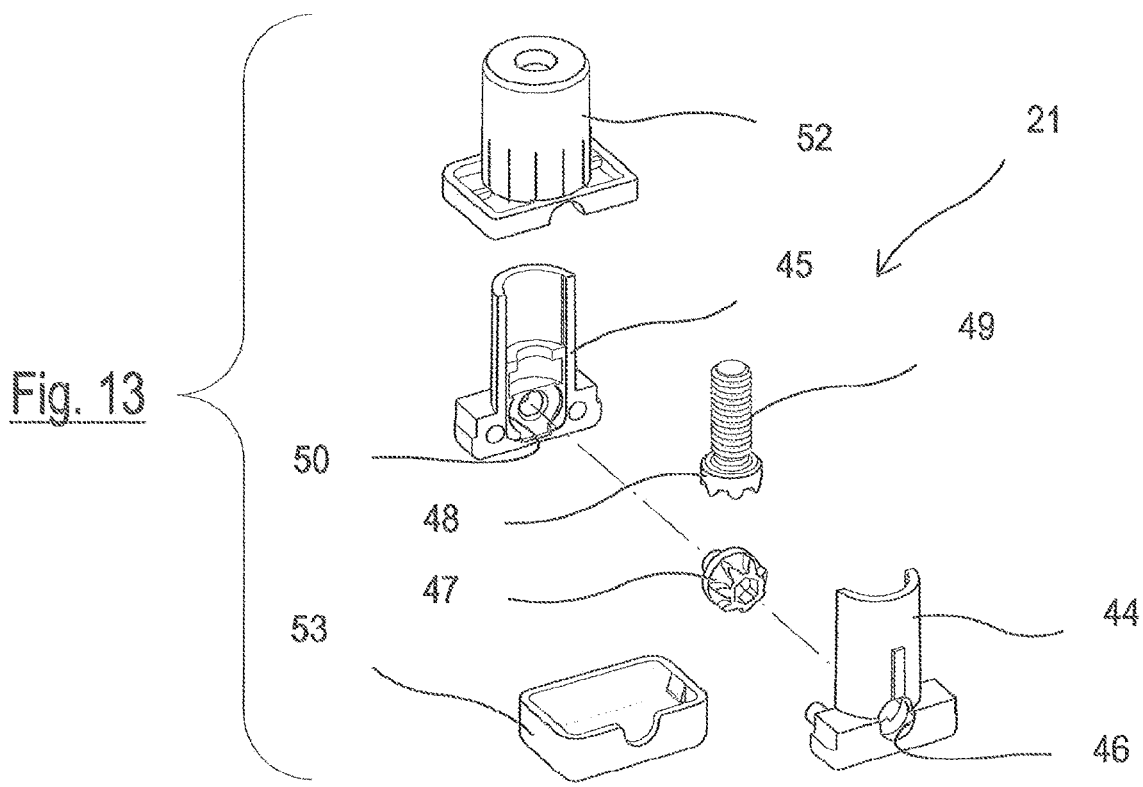
FIG. 13 is a perspective view of the levelling device of FIG. 12 with exploded parts.

From the plan view of FIG. 4 and perspective views for example of FIGS. 1 and 26, it can also be seen how the leveler 21 of the front body 14 and the leveler 21 of the rear body 15 are arranged offset. This offset arrangement also applies to the grub screw the blocking group GB and the housing 28 of the pin 26, 26' of the connection group GC of the joining device.

In this way, thanks to this arrangement, the transmission rods 54 are always in a position parallel to each other, regardless of the depth of the furniture.

This arrangement facilitates the actuation and makes it safer as the forces are applied frontally and perpendicularly to the furniture.

Furthermore this offset arrangement allows the minimum space possible to be occupied and enables an easy actuation of both.

The functioning of the joining and levelling system for parts of furniture and furnishing items with the shoulder on the floor and with minimum encumbrance previous described is simple and can be easily understood from what has just been indicated and shown in the accompanying drawings.

A joining and levelling system of this type for parts of furniture and furnishing items with the shoulder on the floor according to the invention enables there to be no visible holes and also allows an easy connection and levelling of the furniture.

The system is fixed to the bottom of the furniture and allows its front actuation with respect to the furniture through the space between the bottom, shoulder and floor even when the space between the bottom and shoulder and floor is extremely limited due to the minimum encumbrance of the bodies of the system containing the various devices.

It should also be noted that a system of this type according to the invention contains both the connection group GC and the blocking group GB and also the levelling group 21.

Any actuation drawback is eliminated as it is possible to act both in connection and above all in levelling from the front part of the furniture without any visible hole in the furniture itself.

Once the parts of the system have been arranged as indicated in FIGS. 23 to 26 as shown in FIG. 1, it is possible to act with a tool.

A first operation is effected by passing the tool from a front threaded opening 39 of the front body 14 and acting on the grub screw 29 which can be screwed into the same. The grub screw 29 is thus housed in the housing 28 of the pin 26 positioned at a distance a from the shoulder 11. The functioning of the blocking of the blocking group GB of the front body 14 is thus actuated.

Furthermore, the same tool acts on the end of the transmission rod 54 positioned in an opening 76 of the front body. At the other end, the transmission rod is engaged with the grub screw 29 of the blocking group GB of the rear body 15. When said grub screw 29 is screwed into the threaded hole 74, it is brought to be arranged in the housing 28 of the pin 26' positioned at a distance 1 of the shoulder 11. The blocking of the blocking group GB or the rear body 15 is thus actuated.

In this way, the shoulder 11, the bottom 12 and the front body 14 and rear body 15 are blocked together and integral thanks to the presence of the relative connection group GC and blocking group GB.

A similar operation is also effected for the levelling in the present system.

Again from FIG. 1, in fact, it can be seen how, by acting with a tool, passing from the opening 75 of the front body 14, on the pinion 47 of the levelling device 21, the adjustment of the front part of the levelling is effected. This takes place thanks to the movement of the hollow pusher element 52 inside the blind hole 43 of the bottom 12 which, by pushing the bottom 12, causes its upward movement and the adjustment of the leveler.

This levelling operation is completed by acting with a tool on the head of the relative transmission rod 54. Said transmission rod 54 is housed in the opening 55 of the front body 14. The opposite end of the transmission rod 54 thus acts on the pinion 47 of the levelling device 21 housed in the rear body 15. This action identically causes the engagement of the hollow pusher element 52 inside the blind hole 43 of the bottom 12. The raising or lowering of the bottom allows the adjustment or the leveler also present in the rear body 15.

In view of the functioning illustrated above, the characteristics of the system of the present invention are therefore repeated.

A joining and levelling system of this type for parts of furniture and furnishing items allows there to to no visible hole, once it has been correctly assembled for connecting and levelling the furniture, thus giving the furniture a high aesthetic and functional characteristic.

This type of system provides a limited and reduced encumbrance and makes it possible to have a front body and a rear body containing the joining and levelling devices in the presence of a minimum encumbrance between the shoulder and bottom with respect to the floor.

Furthermore, even in the presence of such a reduced encumbrance, it is possible to effect both the connection and blocking between the shoulder and bottom together with the adjustment of the level of the furniture, from the front part of the furniture.

This is all achieved with a front actuation with respect to the furniture through the minimum space between the bottom and shoulder and floor, in an extremely limited space between the bottom, shoulder and floor and generally considered by an operator as being very restricted.

Advantageously, with the system of the present invention, both the connection or joining group with relative blocking and also the levelling group beneath the thickness of the bottom and shoulder of the furniture are particularly compact and easy to actuate on the part of any operator.

Any actuation drawback is eliminated as it is possible to act both in connection and above all in levelling from the front part of the furniture without any visible hole in the furniture itself.

This provision also allows the elimination of any further element that serves for guaranteeing the correct direction or orientation of the screwdriver that must be present in the known additional systems in the form of a guide or similar item fixed to the bottom of the furniture.

The objectives mentioned in the preamble of the description have thus been achieved.

The protection scope of the present invention is defined by the enclosed claims.

The invention claimed is:

1. A joining and levelling system for furniture and furnishing items (M) having a bottom (12) and at least one shoulder (11) positionable with respect to a floor (P), comprising, in combination:
   at least a front body (14);
   at least a rear body (15), wherein each front and each rear body (14,15) comprises at least one connection group (GC) and a blocking group (GB) of a joining device, configured to stably interconnect said bottom (12) and said at least one shoulder; and
   a levelling group (21),
   wherein said connection group (GC), said blocking group (GB) of the joining device, and said levelling group (21) are disposed to be actuated from a front of the furniture and furnishing items,
   wherein said front body (14) and said rear body (15) have a short side positionable in lateral contact with said shoulder (11) and beneath said bottom (12),
   wherein actuation points of said connection group (GC), said blocking group (GB), and said levelling group (21) of said front and rear bodies (14,15) are positionable on a horizontal plane parallel to said floor and to said bottom (12), adjacent to each other,
   wherein a symmetry axis (X) of said connection group (GC) coincides with or is in proximity of a center line of said front and said rear bodies (14, 15), and
   wherein said blocking group (GB) and said levelling group (21) of said rear body (15) are connected to said front body (14) by return rods (54).

2. The joining and levelling system according to claim 1, wherein a thickness of said bottom (12) is substantially equal to a distance (h) between said floor (P) and said bottom (12).

3. The joining and levelling system according to claim 2, wherein a height (h') of said front and said rear bodies (14,15) is substantially equal to said distance (h).

4. The joining and levelling system according to claim 1, wherein said levelling group (21) of said front body (14) is in offset position with respect to the levelling group (21) of said rear body (15).

5. The joining and levelling system according to claim 1, wherein said return rods (54) for each blocking group (GB) and each levelling group (21) of said rear body (15) are positioned parallel to each other.

6. The joining and levelling system according to claim 1, wherein each front and each rear body (14,15) is a molded body in a zinc-based alloy, or another material that provides voids and lightening and/or stiffening ribs.

7. The joining and levelling system according to claim 6, wherein said front and said rear body (14,15) are prismatic and are configured to be associated beneath the bottom (12) and next to said at least one shoulder (11) and provide, at least on the short side, at least one pin extension (78) which is housed in a blind hole (77) formed in said shoulder (11) that is positioned alongside.

8. The joining and levelling system according to claim 6, wherein each front and each rear body (14,15) has a plurality of openings (39, 76, 75, 55; 64, 74, 56) for a maneuvering actuation tool of the connection group (GC), the blocking group (GB), and the levelling group (GL).

9. The joining and levelling system according to claim 6, wherein said front and said rear body (14,15) have a hollow seat or housing (20,20') for the levelling device (21).

10. The joining and levelling system according to claim 9, wherein said hollow seat or housing (20, 20') in said front body (14) is positioned offset with respect to said hollow seat or housing (20') defined in said rear body (15) so as to occupy a minimum possible amount of space and allow a front actuation of the connection group (GC), the blocking group (GB), and the levelling group (21).

11. A joining and levelling system for furniture and furnishing items (M) having a bottom (12) and at least one shoulder (11) positionable with respect to a floor (P), comprising, in combination:
   at least a front body (14);
   at least a rear body (15), wherein each front and each rear body (14,15) comprises at least one connection group (GC) and a blocking group (GB) of a joining device, configured to stably interconnect said bottom (12) and said at least one shoulder; and
   a levelling group (21),
   wherein said connection group (GC), said blocking group (GB) of the joining device, and said levelling group (21) are disposed to be actuated from a front of the furniture and furnishing items,
   wherein said front body (14) and said rear body (15) have a short side positionable in lateral contact with said shoulder (11) and beneath said bottom (12),
   wherein actuation points of said connection group (GC), said blocking group (GB), and said levelling group (21) of said front and rear bodies (14,15) are positionable on a horizontal plane parallel to said floor and to said bottom (12), adjacent to each other,
   wherein a symmetry axis (X) of said connection group (GC) coincides with or is in proximity of a center line of said front and said rear bodies (14, 15), and
   wherein said blocking group (GB) of the joining device of each front body (14) and each rear body (15) comprises a pin (26), positioned integrally in a shoulder (11), and said blocking group (GB) of the joining device comprises a grub screw (29) positioned in a threaded hole (39) that can be moved between an engagement position and a disengagement position with said pin (26).

12. A joining and levelling system for furniture and furnishing items (M) having a bottom (12) and at least one shoulder (11) positionable with respect to a floor (P), comprising, in combination:
   at least a front body (14);
   at least a rear body (15), wherein each front and each rear body (14,15) comprises at least one connection group (GC) and a blocking group (GB) of a joining device, configured to stably interconnect said bottom (12) and said at least one shoulder; and
   a levelling group (21),
   wherein said connection group (GC), said blocking group (GB) of the joining device, and said levelling group (21) are disposed to be actuated from a front of the furniture and furnishing items,
   wherein said front body (14) and said rear body (15) have a short side positionable in lateral contact with said shoulder (11) and beneath said bottom (12),
   wherein actuation points of said connection group (GC), said blocking group (GB), and said levelling group (21) of said front and rear bodies (14,15) are positionable on a horizontal plane parallel to said floor and to said bottom (12), adjacent to each other,
   wherein a symmetry axis (X) of said connection group (GC) coincides with or is in proximity of a center line of said front and said rear bodies (14, 15),
   wherein said levelling group (21) of said front body (14) is in offset position with respect to the levelling group (21) of said rear body (15), wherein said levelling device (21) comprises a cylindrical casing (44,45) containing, in an interior thereof, a pinion-toothed crown bevel (47,48), wherein said pinion (47) is rotatingly positioned inside the cylindrical casing (44,45) and is engaged with said toothed crown (48), formed as a head of a threaded screw (49), said toothed crown (48) being rotatable inside the casing (44,45) and not movable, wherein said threaded screw (49) is positioned in a threaded hole (51) inside a hollow pusher element (52), positioned coaxially with respect to an outside of the cylindrical casing (44,45), and wherein a rotation of the threaded screw (49) causes an upward or downward movement of the hollow pusher element (52) and an adjustment of the leveling device by way of a thrust engagement inside a blind hole (43) formed in said bottom (12).

* * * * *